United States Patent
Lee et al.

(10) Patent No.: US 10,462,441 B2
(45) Date of Patent: Oct. 29, 2019

(54) MOBILE TERMINAL AND CONTROL METHOD THEREFOR

(71) Applicant: LG ELECTRONICS INC., Seoul (KR)

(72) Inventors: Jinsool Lee, Seoul (KR); Seonyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/753,252

(22) PCT Filed: Oct. 28, 2015

(86) PCT No.: PCT/KR2015/011440
§ 371 (c)(1),
(2) Date: Feb. 16, 2018

(87) PCT Pub. No.: WO2017/030236
PCT Pub. Date: Feb. 23, 2017

(65) Prior Publication Data
US 2018/0241980 A1    Aug. 23, 2018

(30) Foreign Application Priority Data

Aug. 20, 2015 (KR) .......................... 10-2015-0117548

(51) Int. Cl.
*H04N 9/73* (2006.01)
*H04N 5/235* (2006.01)
(Continued)

(52) U.S. Cl.
CPC ........... *H04N 9/735* (2013.01); *H04N 5/2258* (2013.01); *H04N 5/235* (2013.01);
(Continued)

(58) Field of Classification Search
CPC ...... H04N 9/735; H04N 5/217; H04N 5/2258; H04N 5/232; H04N 5/235; H04W 88/02
See application file for complete search history.

(56) References Cited

U.S. PATENT DOCUMENTS 9,681,111 B1 *  6/2017  Newman ............. H04N 9/8205
2017/0011525 A1 * 1/2017  Kim .................... G06K 9/00771

FOREIGN PATENT DOCUMENTS

JP    2011-103659 A    5/2011
JP    5118165 B2       1/2013
(Continued)

*Primary Examiner* — Twyler L Haskins
*Assistant Examiner* — Fayez Bhuiyan
(74) *Attorney, Agent, or Firm* — Birch, Stewart, Kolasch & Birch, LLP

(57) ABSTRACT

A mobile terminal according to the present disclosure comprises: a terminal body; a display unit mounted on the terminal body; a first camera which is disposed on one surface of the terminal body and takes a photograph at a first angle of view; a second camera which is disposed adjacent to the first camera and takes a photograph at a second angle of view larger than the first angle of view; and a controller which sets a white balance reference value using image data acquired by the second camera and outputs, to the display unit, a corrected image acquired by correcting an image, captured by the first camera, on the basis of the white balance reference value.

12 Claims, 10 Drawing Sheets

(51) Int. Cl.
    *H04N 5/225*           (2006.01)
    *H04N 5/232*           (2006.01)
    *H04N 5/247*           (2006.01)
    *H04N 9/04*            (2006.01)
    *H04N 13/239*         (2018.01)
    *H04W 88/02*         (2009.01)

(52) U.S. Cl.
    CPC ..... *H04N 5/23216* (2013.01); *H04N 5/23222* (2013.01); *H04N 5/23238* (2013.01); *H04N 5/232945* (2018.08); *H04N 5/247* (2013.01); *H04N 9/045* (2013.01); *H04N 13/239* (2018.05); *H04W 88/02* (2013.01)

(56) References Cited

FOREIGN PATENT DOCUMENTS

| | | |
|---|---|---|
| JP | 2013-207721 A | 10/2013 |
| JP | 5348687 B2 | 11/2013 |
| WO | WO 2012/086966 A2 | 6/2012 |

\* cited by examiner

MOBILE TERMINAL AND CONTROL METHOD THEREFOR

CROSS REFERENCE TO RELATED APPLICATIONS

This application is the National Phase of PCT International Application No. PCT/KR2015/011440, filed on Oct. 28, 2015, which claims priority under 35 U.S.C. 119(a) to Patent Application No. 10-2015-0117548, filed in Republic of Korea on Aug. 20, 2015, all of which are hereby expressly incorporated by reference into the present application.

BACKGROUND OF THE INVENTION

1. Field of the Invention

The present disclosure relates to a mobile terminal having a camera for capturing an image.

2. Description of the Related Art

Mobile terminals may include all types of devices configured to have a battery and a display unit, and display information on the display unit using power supplied from the battery, and formed to allow a user to hand-carry it. The mobile terminal may include a device configured to record and play a video and a device configured to display a graphic user interface (GUI), and may include a laptop computer, a portable phone, glasses, a watch, a game machine, and the like capable of displaying screen information.

As it becomes multifunctional, a mobile terminal can be allowed to capture still images or moving images, play music or video files, play games, receive broadcast and the like, so as to be implemented as an integrated multimedia player. Moreover, efforts are ongoing to support and increase the functionality of mobile terminals. Such efforts include software and hardware improvements, as well as changes and improvements in the structural components.

As the use of cameras of mobile terminal users increases, capturing is carried out at various positions to form an image through light reflected by various light sources. In this case, in case where a white balance algorithm is carried out through color distribution received from an view of angle of the camera, when the light source cannot be estimated or the color has a color similar to that of the light source, a color error may occur during correction, thereby causing the deterioration of camera quality.

SUMMARY OF THE INVENTION

Accordingly, an object of the present disclosure is to provide a mobile terminal having a camera with improved white balance accuracy.

In order to accomplish the foregoing objective of the present disclosure, a mobile terminal according to an embodiment may include a terminal body, a display unit mounted on the terminal body, a first camera disposed on one side of the terminal body to capture at a first angle of view, a second camera disposed adjacent to the first camera to capture at a second angle of view larger than the first angle of view, and a controller controlled to set a white balance reference value using image data acquired by the second camera, and display a correction image in which an image captured by the first camera is corrected based on the white balance reference value on the display unit. Accordingly, a more accurate white balance reference value may be formed using rich image data acquired with a wider angle of view.

For an example related to the present disclosure, the mobile terminal may further include an additional sensor for sensing the type of light to determine the type of the light source. Accordingly, a more accurate white balance reference value may be formed using information on the type of the light source.

For an example related to the present disclosure, the controller may display a warning message and a guide image for moving the terminal body to obtain more image data in order to form a white balance reference value. Accordingly, the user may easily move the terminal body to receive an image formed of a color closer to that of a real object.

According to the present disclosure, since the color correction of a first image may be carried out by a white balance reference value formed using image data captured at a wider angle of view, thereby minimizing the color error. In particular, color correction may be carried out without using an additional light source estimation process using more expanded image data as compared with the case of a subject having a color similar to that of the light source.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
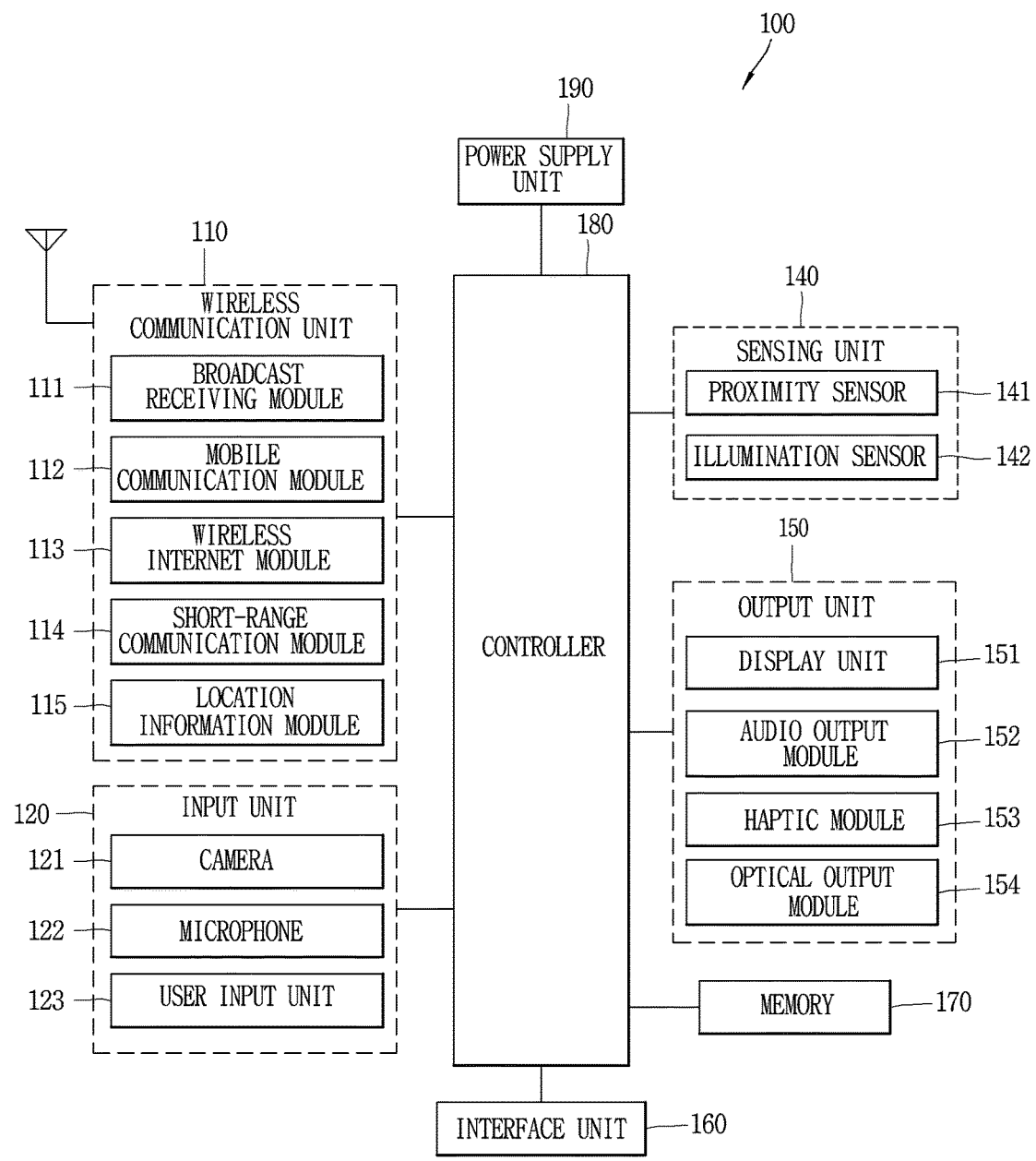
FIG. 1A is a block diagram for explaining a mobile terminal associated with the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
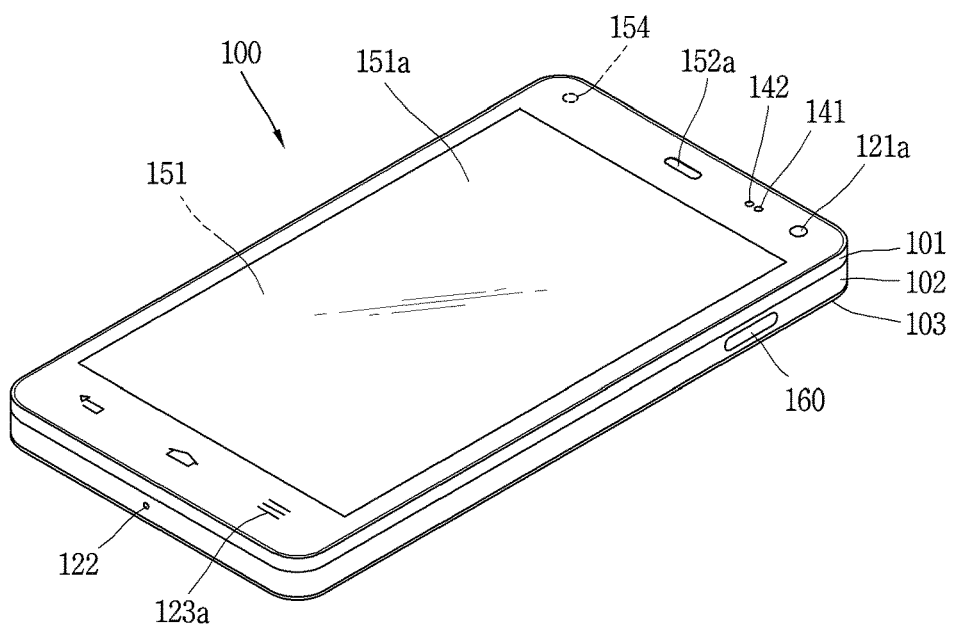
FIGS. 1B and 1C are views illustrating a mobile terminal associated with the present disclosure that is seen from different directions.
Figure 1C:
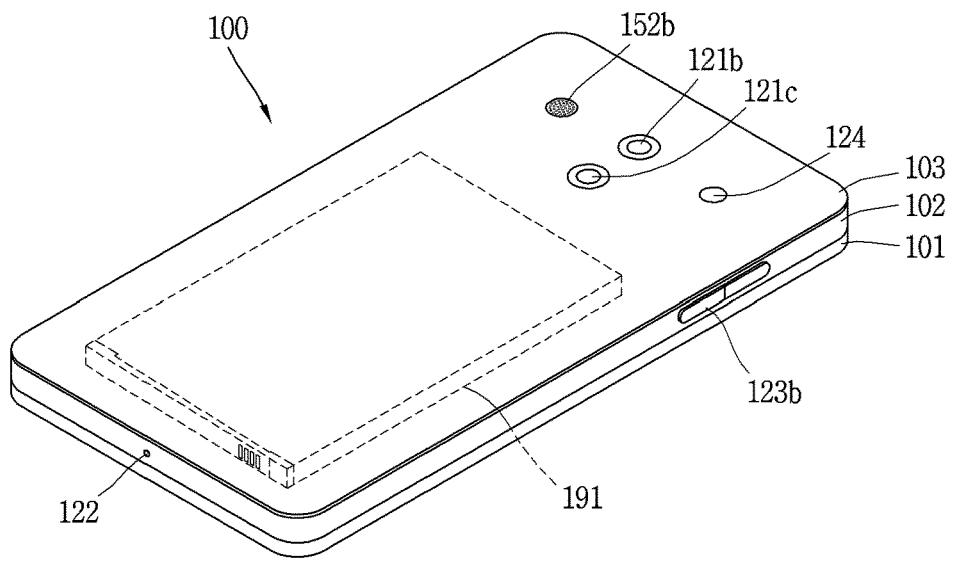

Referring to FIGS. 1A through 1C, FIG. 1A is a block diagram for explaining a mobile terminal associated with the present disclosure, and FIGS. 1B and 1C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to like data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the WiFi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may be configured with a stereoscopic display unit 151 for displaying a stereoscopic image.

A stereoscopic method (glasses method), an auto-stereoscopic method (no-glasses method), a projection method (holographic method), and the like may be applicable to the stereoscopic display unit 151.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller 180. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

In this manner, the display unit 151 may form a flexible touch screen along with the touch sensor, and in this case, the touch screen may function as the user input unit 123 (refer to FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images acquired by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include, a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2A:
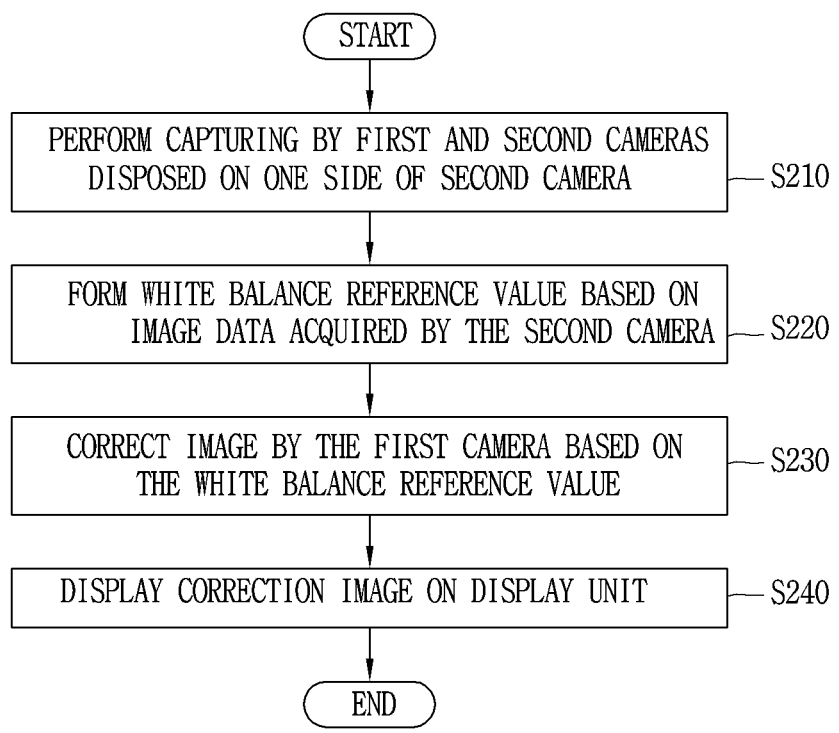
FIG. 2A is a flowchart for explaining a method of controlling a mobile terminal according to an embodiment of the present disclosure.
Figure 2B:
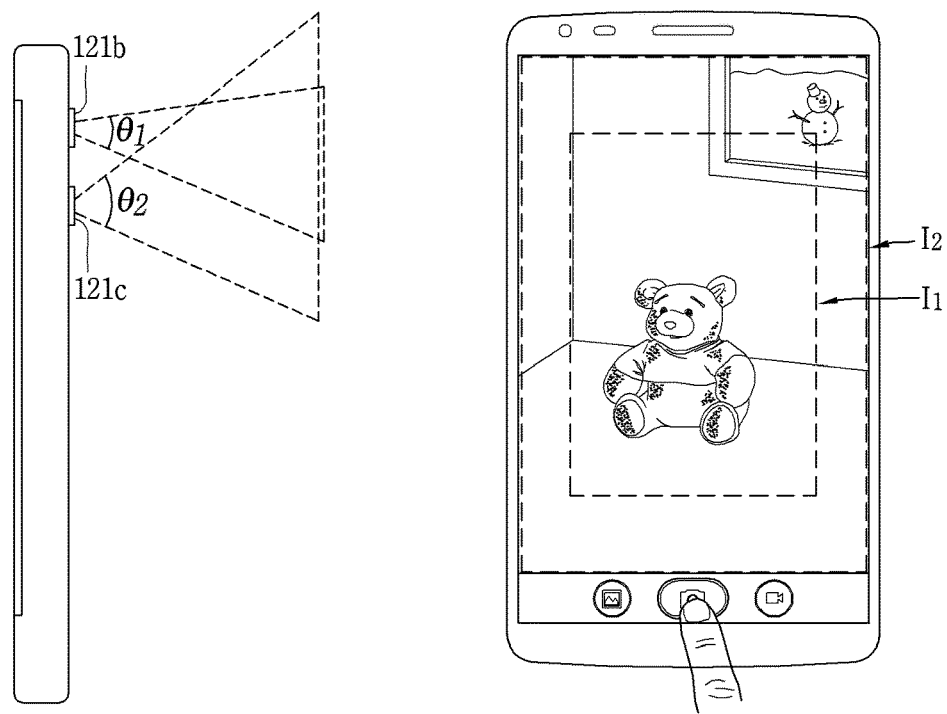
FIG. 2B is a conceptual view for explaining the control method of FIG. 2A.
Figure 2B:
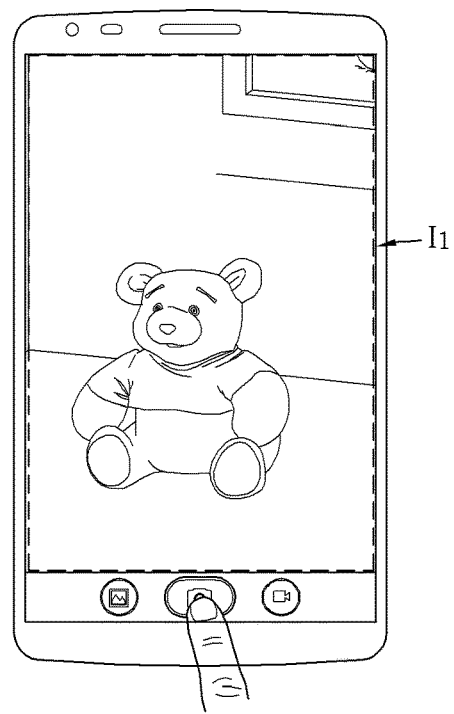

FIG. 2A is a flowchart illustrating a method of controlling a mobile terminal according to an embodiment of the present disclosure, and FIG. 2B is a conceptual view illustrating the control method of FIG. 2A.

Referring to FIGS. 2A and 2B, capturing is carried out by first and second cameras disposed on one side of the terminal body (S210). For example, the rear camera 121b and a wide angle camera 121c may be disposed on a rear surface of the terminal body. The rear camera 121b and the wide angle camera 121c are disposed adjacent to each other. The wide angle camera 121c may be disposed adjacent to the front camera 121a disposed on a front surface of the terminal body. For the sake of convenience of explanation, the rear camera or front camera is defined as a first camera, and the wide angle camera is defined as a second camera.

Capturing is carried out by first by the first and second cameras disposed on one side of the terminal body (S210). An angle of view (θ2) of the second camera is formed to be larger than that (θ1) of the first camera. The controller 180 activates the first and second cameras 121b and 121c at the same time. The second camera 121b forms the image data of an external environment including a capturing range of the first camera 121b.

The controller 180 forms a white balance reference value based on image data acquired by the second camera 121c (S220). The controller 180 corrects an image acquired by the first camera based on the white balance reference value (S230) and displays the corrected image (I1') on the display unit 151.

When a first control command for activating the first camera 121b is applied, the controller 180 activates the second camera 121c together with the first camera 121b. Accordingly, an image captured by the first camera 121b is corrected by a white balance reference value using the image data acquired by the second camera 121c.

Alternatively, when a second control command for activating the second camera 121c is applied, the controller 180 activates only the second camera 121c. In this case, the first camera 121b maintains an inactive state. The controller 180 may correct an image captured by the second camera 121c to display the corrected image on the display unit 151. In other words, when image capturing using a wide angle camera is carried out by the user, the first camera 121b may maintain an inactive state to prevent power consumption.

Referring to FIG. 2B, the controller 180 may activate the first and second cameras together, and displays images captured by the first and second cameras together on the display unit 151. However, the present disclosure is not limited thereto, and only an image (I1) acquired by the first camera 121b may be displayed on the display unit 151 as a preview image based on the setting of the user.

The first and second images (I1, I2) acquired by the first and second cameras 121b and 121c may be displayed together on the display unit 151. One region of the second image (I2) is substantially the same as the first image (I1), and thus only the second image (I2) may be displayed on the display portion 151. Although not specifically shown in the figure, the controller 180 may control the second image (I2) not to be stored in the memory 170.

The controller 180 may control the display unit 151 to display the second image (I2) corrected by the white balance reference value as the preview image, but the present disclosure is not limited thereto.

The display unit 151 may display the first image (I1) prior to correction or the second image (I2) subsequent to correction. The controller 180 may correct the first image (I1) based on the white balance reference value when a control command for capturing (and storing) the image is applied. The display unit 151 displays a correction image (I1') based on the capturing control command. When the capturing control command is applied, the display unit 151 does not display the second image (I2).

According to the present embodiment, the controller 180 may perform the color correction of a first image by a white balance reference value formed using image data captured at a wider angle of view, thereby minimizing the color error. In particular, color correction may be carried out without using an additional light source estimation process using more expanded image data as compared with the case of a subject having a color similar to that of the light source.

Figure 3A:
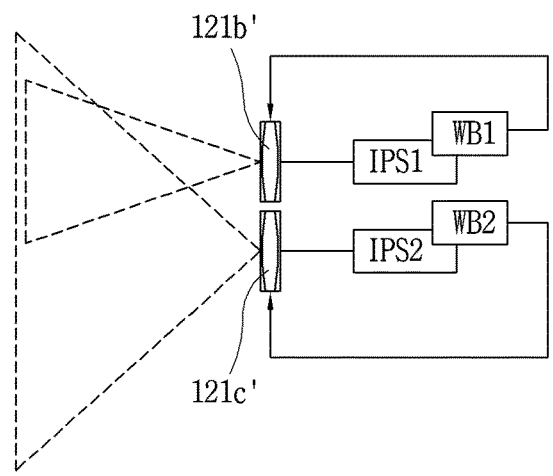
FIGS. 3A and 3B are conceptual views illustrating the elements of a camera module.
Figure 3B:
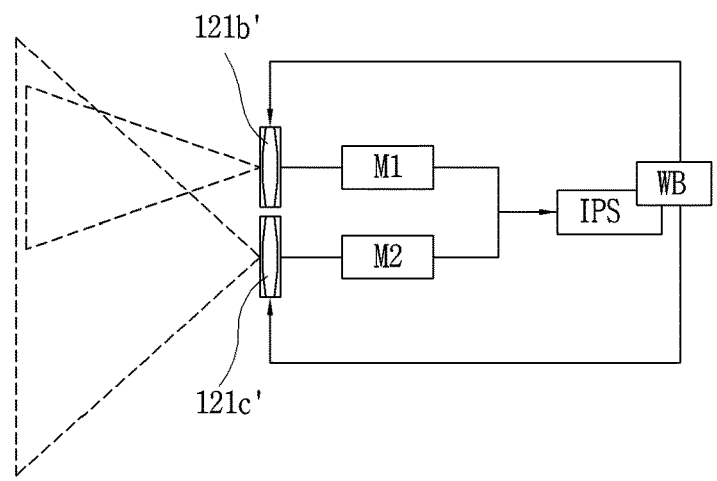

FIGS. 3A and 3B are conceptual views illustrating the elements of a camera module.

As illustrated in FIG. 3A, the camera module includes first and second lenses 121b', 121c', first and second ISPs (ISP1, ISP2), and first and second correction modules (WB1, WB2). Images formed by the first and second lenses 121b', 121c' are formed together with information that are distinguished from each other.

Referring to FIG. 3A, the first ISP (ISP1) is connected to the first lens 121b', and an image captured by the first lens 121b' is input to the first ISP (ISP1). Furthermore, an image captured by the second lens 121c' is input to the second ISP (ISP2). A calibration process in which errors according to the sensor characteristics of the first and second lenses 121b', 121c', respectively, are corrected may be carried out to minimize the color difference.

The first correction module (WB1) generates a white balance reference value through an image input to the first ISP (ISP1), and the second correction module (WB2) generates a white balance reference value using an image input to the second ISP (ISP2). When the first correction module (WB1) fails to generate a white balance reference value, the controller 180 corrects the first image using a white balance reference value formed by the second correction module (WB2).

Here, a case where the first correction module (WB1) fails to generate a white balance reference value may correspond to a case where the estimation of a light source is disabled by color distribution data (image data) constituting the first image.

The controller 180 may control the activation of the second lens 161c' while the first lens 161b' is driven based on the setting of the user. For example, when the first correction module (WB1) fails to generate a white balance reference value due to a first image received by the first lens 161b', in other words, when it is difficult to estimate the light source, it may be controlled to activate the lens 161c'.

Referring to FIG. 3B, the camera module includes first and second lenses 121b', 121c', first and second memories (M1, M2), one ISP, and one correction module (WB).

The first and second images formed by the first and second lenses 121b', 121c' are stored in the first and second memories (M1, M2), respectively. A calibration process in to which errors according to the sensor characteristics of the first and second lenses 121b', 121c', respectively, are corrected may be carried out to minimize the color difference.

The first and second images are delivered to one ISP. The ISP according to the present embodiment is preferably driven at a speed twice that of the first and second ISPs (ISP1, ISP2). The ISP receives the first and second images alternately from the first and second memories (M1, M2).

When the ISP fails to form a white balance reference value by a first image acquired by the first lens 121b', the ISP outputs a white balance reference value formed by a second image received from the second lens 121c'. The correction module connected to the ISP corrects the first image using the output white balance reference value.

Here, a case where the first correction module (WB1) fails to generate a white balance reference value may correspond to a case where the estimation of a light source is disabled by color distribution data (image data) constituting the first image.

Figure 4:
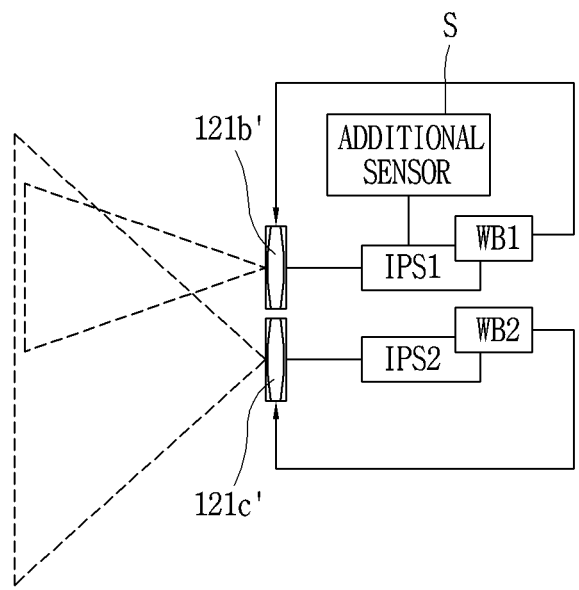
FIG. 4 is a conceptual view illustrating the elements of a camera module according to another embodiment.

FIG. 4 is a conceptual view illustrating the elements of a camera module according to another embodiment.

The camera module according to the present embodiment includes first and second lenses 121b', 121c', first and second ISPs (ISP1, ISP2) connected to the first and second lenses (121b', 121c'), respectively, and an additional sensor (S) connected to the first and second correction modules (WB1, WB2) and to the first ISP (ISP1). The elements of the camera module are substantially the same as those of the camera module in FIG. 3A except for the additional sensor (S). Therefore, the same reference numerals will be assigned to the same elements, and redundant explanation thereof will be omitted.

The additional sensor (S) includes a sensor module for sensing ultraviolet (UW) and infrared (IR) rays. When the ultraviolet and infrared rays are sensed by the additional sensor (S), the controller 180 may estimate that sunlight (natural light) is a light source. If an infrared (IR) component is sensed by the additional sensor (S), it may be estimated that the light source corresponds to an incandescent lamp. The controller 180 may classify the type of the light source into sunlight, an incandescent lamp, a fluorescent lamp, or the like according to the type of a wavelength sensed by the additional sensor (S).

The first correction module (WB1) estimates the type of the light source by the first lens 121b' and forms a white balance reference value using the image data of the first image. However, when the first correction module (WB1) fails to generate a white balance reference value, the controller 180 may form a white balance reference value through the second image (image data).

Although not shown in the drawing, the camera module according to the present embodiment may be implemented by including the additional sensor (S) in the elements of the camera module illustrated in FIG. 3B. In this case, the additional sensor is connected to the one ISP to estimate a light source by the first and second images received from the first and second memories (M1, M2).

According to the present embodiment, the type of the light source may be estimated using the additional sensor to form a more accurate white balance reference value together with the image data of the second image.

Figure 5A:
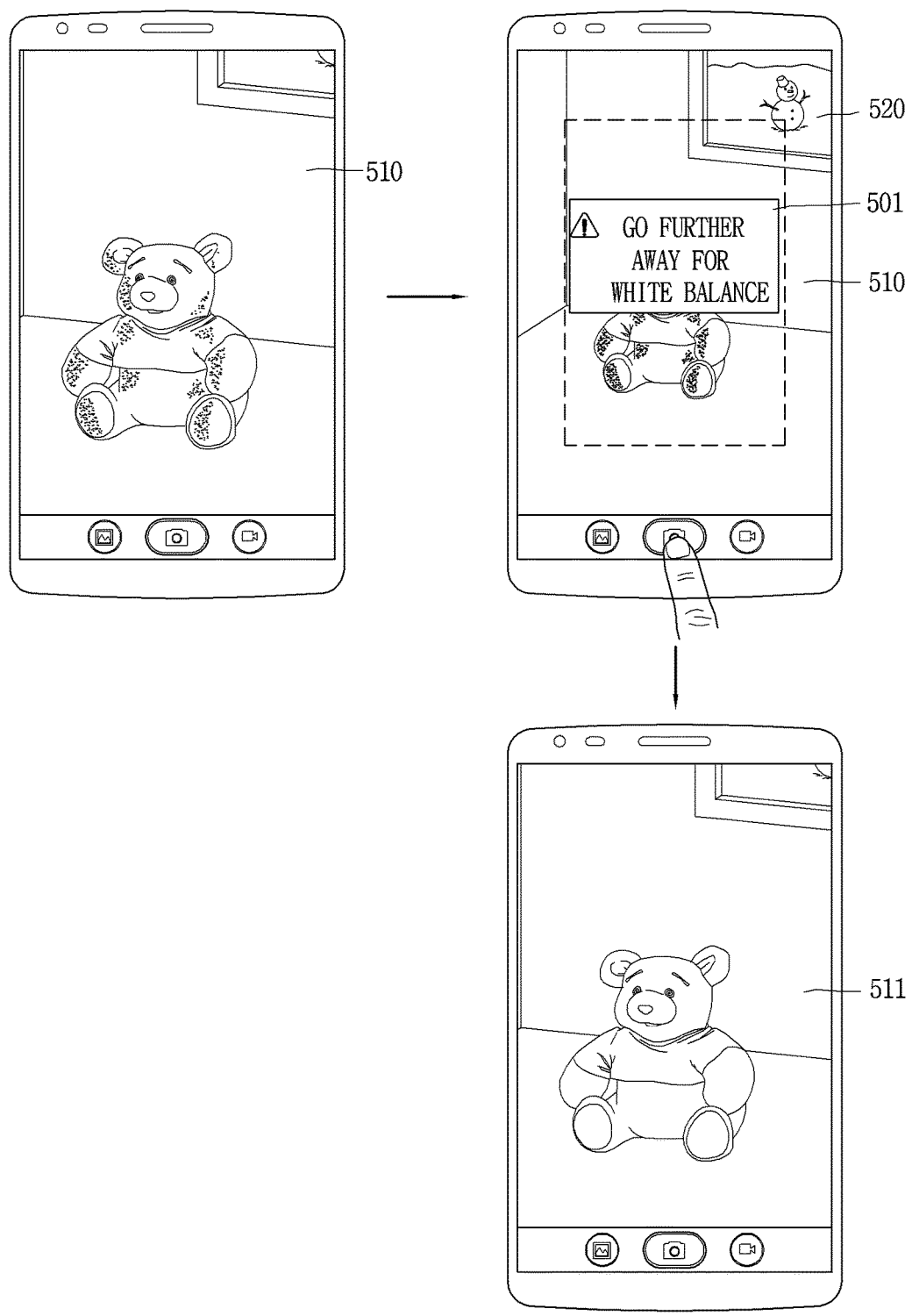
FIGS. 5A and 5B are conceptual views illustrating a control method of a mobile terminal for acquiring image data.
Figure 5B:
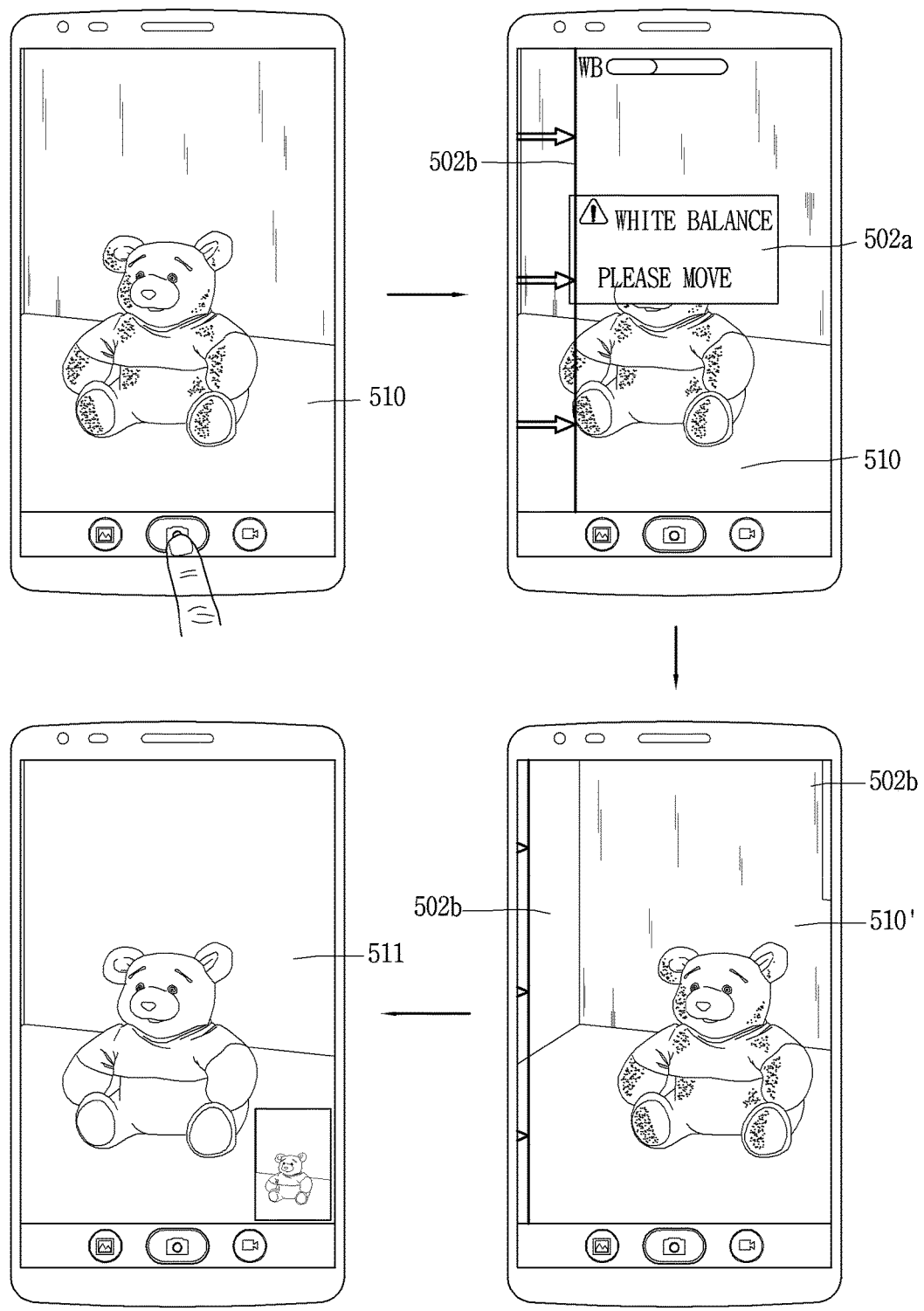

FIGS. 5A and 5B are conceptual views illustrating a control method of a mobile terminal for acquiring image data.

Referring to FIG. 5A, the controller 180 acquires image data by the activated first and second cameras 121b, 121c. The display unit 151 displays a first image 510 acquired by the first camera 121b as a preview image. When a capturing control command is applied while the preview image is being displayed, the controller 180 forms a white balance reference value using image data acquired by the second camera 121c.

When image data for forming the white balance reference value is insufficient, the controller 180 controls the display unit 151 to display a warning message 501 for securing the image data. For example, the controller 180 may include a message suggesting the movement of the mobile terminal to acquire the image data of a more extended region. In this case, the display unit 151 may display the second image 520. The display unit 151 may display the first and second images 510,520 in a distinguished manner.

For example, when a specific subject is sensed on the first image, the controller 180 may display a warning message 501 for guiding the mobile terminal to move away from the subject in order to additionally acquire the image data. When the mobile terminal moves away from the subject, a wider region extended on the basis of the subject may be sensed by the second camera 121c.

The controller 180 generates a white balance reference value using image data acquired by the second camera 121c' when the terminal body moves. The display unit 151 controls the second image 520 to disappear from the display unit 151 when the white balance reference value is generated.

The controller 180 controls the display unit 151 to color-correct the first image using the white balance reference value 151 and display the correction image 511. When the correction image 511 is formed, the controller 180 may control the correction image 511 to be stored in the memory 170 based on the capturing control command.

Although not specifically shown in the drawing, when an image collected by the first camera 121b is changed according to the movement of the mobile terminal, the controller 180 may correct and store an image acquired by the first camera 121b and displayed as a preview image on the display unit 151 at the time when the capturing control command is applied. However, the image acquired by the first camera 121b may be corrected and stored at the time when the white balance reference value is formed based on the setting of the user.

According to the present embodiment, when image data collected by the second camera is insufficient to form the white balance reference value, a more accurate white balance reference value may be formed by a simple method of allowing the user to move the mobile terminal.

Referring to FIG. 5B, the controller 180 displays a first image 510 acquired by the activated first camera 121b as a preview image. The controller 180 forms a white balance reference value based on image data acquired by the second camera 121c based on a capturing control command applied. The controller 180 controls the display unit 151 to display a warning message 502a and a guide image 502b for guiding the movement of the mobile terminal when data image for forming the white balance reference value is insufficient.

For example, the controller 180 controls movement to a region where light for forming the white balance reference value is expected to be collected. For example, the controller 180 may display the guide image 502b to move to a region where light is emitted, a region where the light of a color distinguished from the currently acquired image data is collected. The guide image 502b may be formed in a shape suggesting a moving direction of the mobile terminal, but the present disclosure is not limited thereto. Furthermore, the guide image 502b may be modified according to the movement of the mobile terminal.

The controller 180 may modify the guide image 502b based on the movement of the mobile terminal and resultant image data acquired by the second camera 121c. The controller 180 may control the display unit 151 to allow the guide image 502b to disappear when sufficient image data for forming the white balance reference value is acquired.

Meanwhile, the display unit 151 may continuously display a preview image acquired by the first camera 121b while the mobile terminal is moving, but the present disclosure is not limited thereto. For example, the display unit 151 may continuously display the first image 510 at the time when the capturing control command is applied. Alternatively, the display unit 151 may temporarily display an image acquired by the second camera 121c together with the guide image 502b.

When the white balance reference value is formed, the controller 180 controls the display unit 151 to display a correction image 511 in which the first image 510 is corrected by the white balance reference value, and controls the memory 170 to store the correction image 511.

Figure 6A:
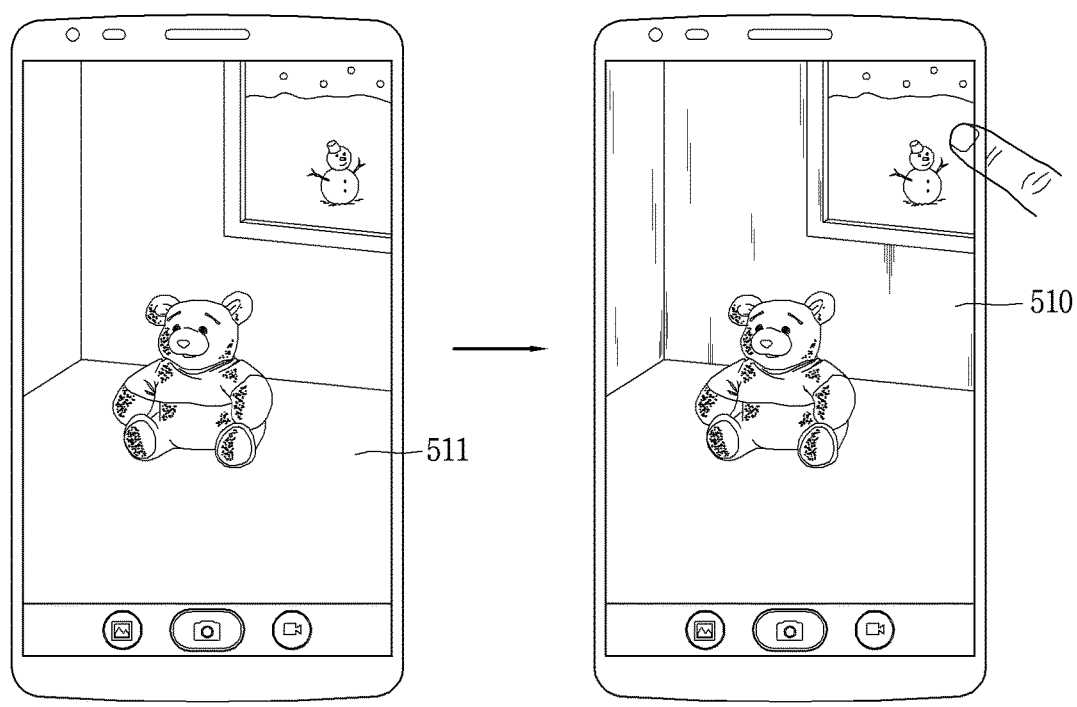
FIGS. 6A and 6B are conceptual views for explaining a control method of providing a pre-correction image.
Figure 6B:
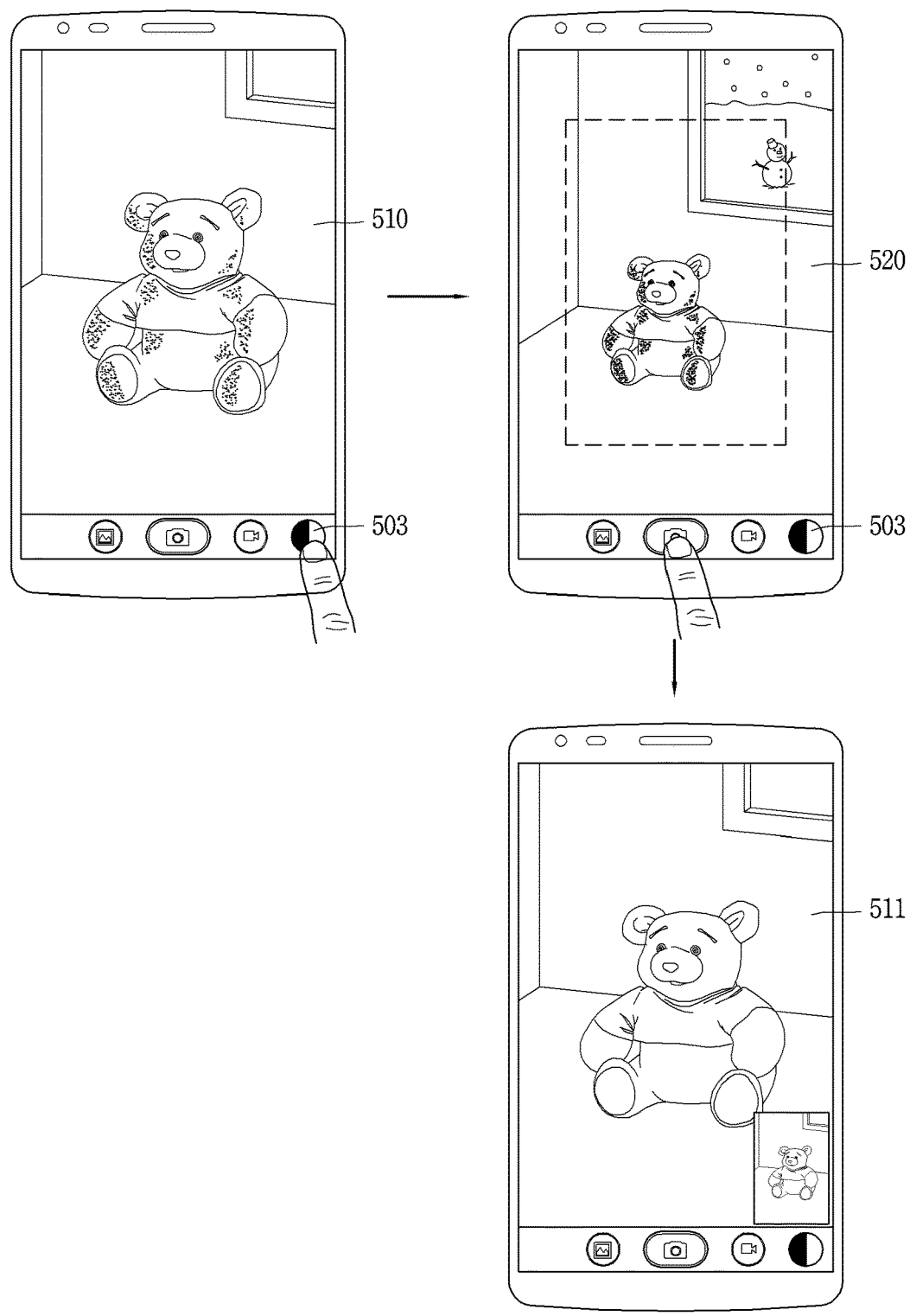

FIGS. 6A and 6B are conceptual views for explaining a control method of providing a pre-correction image.

Referring to FIG. 6A, the controller 180 forms a white balance reference value based on image data acquired by the second camera 121c in a state where the first and second cameras 121b, 121c are activated. The display unit 151 displays a correction image 511 in which the first image is corrected based on the white balance reference value, as a preview image.

The controller 180 controls the memory 170 to store the corrected image 511 when the capturing control command is applied in a state where the corrected image 511 is displayed.

On the other hand, the controller 180 controls the display unit 151 to display the first image 510 acquired by the first camera 121b when a specific type of touch is applied to the preview image 511. Here, the first image 510 corresponds to an image prior to being corrected by the white balance.

Here, the specific type of touch input may correspond to a long touch input applied to the display unit 151. The controller 180 may control the display unit 151 to display the first image 510 while the touch is being applied to the display unit 151 and display the correction image 511 when the touch is released.

Referring to FIG. 6B, the controller 180 activates the second camera 121c based on a touch applied to a specific icon 503 while activating only the first camera 121b. The icon 503 is displayed on the first image 510 acquired by a first camera 121b. The first image 510 corresponds to a pre-correction image.

The controller 180 controls the memory 170 to store the first image 510 when the capturing control command is applied in a state where the first image 510 is displayed. When a touch is applied to the icon 503, the controller 180 activates the second camera 121c, and forms a white balance reference value using image data acquired by the second camera 121c.

The display unit 151 may display a second image 520 formed by the second camera 121c. A sort image that distinguishes the first and second images 510, 520 may be displayed on the second image 520. When the capturing control command is applied in a state where the second camera 121c is activated (i.e., the second image 520 is displayed on the display unit 151), the controller 180 controls the display unit 151 to correct the first image 510 based on the balance reference value, and displayed the corrected correction image 511. In addition, the correction image 511 may be stored in the memory 170.

According to the present embodiment, the activation of the second camera 121c may be controlled by a user's selection.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

The present embodiments may provide a control method for white balance correction using a different angle of view, and may be applicable to various industrial fields related thereto.

What is claimed is:

1. A mobile terminal, comprising:
   a terminal body;
   a display unit mounted on the terminal body;
   a first camera disposed on one side of the terminal body to capture an image at a first angle of view;
   a second camera disposed adjacent to the first camera to capture an image at a second angle of view larger than the first angle of view; and
   a controller controlled to set a white balance reference value using image data acquired by the second camera, and display a correction image in which an image captured by the first camera is corrected based on the white balance reference value on the display unit,
   wherein the first and second cameras respectively comprise first and second lenses,
   wherein the mobile terminal further comprises one image signal processor (ISP) configured to alternately receive light incident on the first and second lenses, and
   wherein when a white balance reference value is not generated based on image data according to the light incident by the first lens, the one ISP outputs a white balance reference value based on image data according to the light incident by the second lens.

2. The mobile terminal of claim 1, wherein light incident on the first and second lenses is formed as image data by first and second ISPs.

3. The mobile terminal of claim 1, further comprising:
   first and second memories configured to respectively store image data formed by the first and second lenses.

4. The mobile terminal of claim 1, wherein the controller controls the display unit to display an image by the first camera while a specific touch input is applied on the correction image.

5. The mobile terminal of claim 1, wherein the controller controls the second camera to maintain an inactive state while the first camera is activated, and activates the second camera based on a specific control command to form the white balance reference value.

6. The mobile terminal of claim 1, further comprising:
   an additional sensor configured to sense the type of light,
   wherein the controller estimates the type of a light source by the additional sensor to form the white balance reference value based on the estimated information of the light source.

7. The mobile terminal of claim 6, wherein the additional sensor is formed to sense at least one of infrared (IR) and ultraviolet (UV) rays.

8. The mobile terminal of claim 1, wherein the controller controls the display unit to display a warning message suggesting the movement of the terminal body to acquire additional image data for forming the white balance reference value.

9. The mobile terminal of claim 8, wherein the display unit displays a guide image for guiding a moving direction of the terminal body.

10. The mobile terminal of claim 1, wherein the controller activates the first and second cameras together based on a first control command for executing the first camera.

11. The mobile terminal of claim 10, wherein the controller activates only the second camera and maintains the first camera in an inactive state based on a second control command for executing the second camera.

12. A control method of a mobile terminal comprising first and second cameras disposed on one side of a terminal body and having different angles of view, the control method of the mobile terminal comprising:
    performing capturing of images using the first and second cameras;
    forming a white balance reference value using image data acquired by the second camera;
    correcting the image by the first camera using the white balance reference value; and
    displaying the corrected image on a display unit,
    wherein the angle of view of the second camera is greater than that of the first camera,
    wherein the first and second cameras respectively comprise first and second lenses,
    wherein the mobile terminal further comprises one image signal processor (ISP) alternately receiving light incident on the first and second lenses, and
    wherein when a white balance reference value is not generated based on image data according to the light incident by the first lens, the one ISP outputs a white balance reference value based on image data according to the light incident by the second lens.

* * * * *